United States Patent
Chang et al.

(10) Patent No.: US 7,289,406 B2
(45) Date of Patent: Oct. 30, 2007

(54) WRITABLE AREA DETECTION DEVICE FOR OPTICAL RECORDING/REPRODUCING APPARATUS AND METHOD THEREOF

(75) Inventors: Soo-jung Chang, Suwon (KR); Gae-ok Cho, Yongin (KR); Jung-eun Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 576 days.

(21) Appl. No.: 10/730,060

(22) Filed: Dec. 9, 2003

(65) Prior Publication Data

US 2004/0145990 A1    Jul. 29, 2004

(30) Foreign Application Priority Data

Jan. 25, 2003   (KR) .................. 10-2003-0005077

(51) Int. Cl.
*G11B 7/00*   (2006.01)
(52) U.S. Cl. .................................. 369/53.24
(58) Field of Classification Search ......... 369/47.1, 369/47.27, 47.28, 47.33, 53.24, 53.25, 124.15
See application file for complete search history.

(56) References Cited

U.S. PATENT DOCUMENTS

| | | | |
|---|---|---|---|
| 4,545,044 A | * | 10/1985 | Satoh et al. ............ 369/30.09 |
| 5,721,719 A | | 2/1998 | Ohta |

FOREIGN PATENT DOCUMENTS

| | | | |
|---|---|---|---|
| EP | 0 668 588 A1 | | 8/1995 |
| JP | 63-81659 | * | 4/1988 |
| JP | 07-235054 A | | 9/1995 |

* cited by examiner

*Primary Examiner*—Nabil Hindi
(74) *Attorney, Agent, or Firm*—Sughrue Mion, PLLC

(57) ABSTRACT

A writable area detection device for an optical recording/reproducing apparatus comprises a waveform rectification unit for comparing an RF signal read from a user data area of a recording medium with a reference signal, and outputting a rectified pulse signal; a pulse generation unit for generating a signal having a pulse width including a section in which a high frequency signal of the rectified pulse signal is regularly distributed; a latch unit for latching the signal generated in the pulse generation unit; and a detection unit for detecting the section in which the high frequency signal is regularly distributed by using an output signal of the latch unit and an output signal of the pulse generation unit.

14 Claims, 5 Drawing Sheets

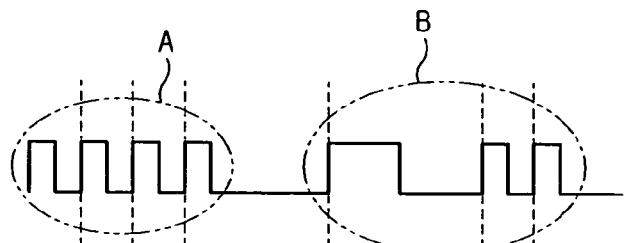
FIG. 5A
FIG. 5B
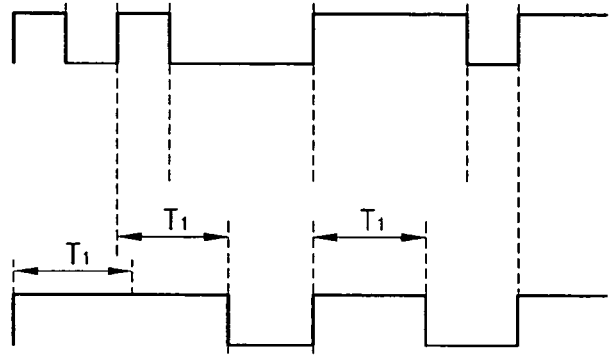
FIG. 5C
FIG. 5D
FIG. 5E

WRITABLE AREA DETECTION DEVICE FOR OPTICAL RECORDING/REPRODUCING APPARATUS AND METHOD THEREOF

BACKGROUND

This application is based on Korean Patent Application No. 2003-5077 filed on Jan. 25, 2003, the disclosure of which is incorporated herein by reference in its entirety.

1. Field of the Invention

The present invention relates to an optical recording/reproducing apparatus, and more particularly to a detecting device for detecting a writable area before writing or reading of data with respect to an optical recording medium, and a detection method thereof.

2. Description of the Related Art

In general, one example of a rewritable optical recording media which enables repeatable writing is an optical disc such as a rewritable compact disc (CD-RW), a rewritable digital versatile disc (DVD-RW, DVD-RAM, DVD+RW).

As shown in a conceptual view of FIG. 1, an optical recording medium is divided into a header area for storing information data, and a user data area on which user data is stored. The user data area (Land/Groove track) is divided into a writable area on which data is recorded and a non-writable area on which data is not recorded.

The header area is placed in a predetermined portion of a sector on an optical recording medium, and the optical pickup (not shown) of an optical recording/reproducing apparatus can recognize a sector number, a sector type, a user data area, and so on, through information recorded in the header area. As described, even though the user data area can be recognized through the information on the header area, a writable area detection device has to be provided in order to precisely detect data-recorded recording portions of the user data area. The reason for detecting data-recorded portions of the user data area is to process only a reproduction signal read from a writable area separated from a non-writable area on which data is not recorded. That is, the recording portions have to be precisely detected in order to prevent errors of determining as a reproduction signal noise components from the non-writable area.

SUMMARY

The present invention has been devised to solve the above problem, so it is an aspect of the present invention to provide a writable area detection device and method for an optical recording/reproducing apparatus, capable of precisely detecting data-recorded recording portions of a user data area on an optical recording medium.

In order to achieve the above aspect, a writable area detection device for an optical recording/reproducing apparatus comprises a waveform rectification unit for comparing an RF signal read from a user data area of a recording medium with a reference signal, and outputting a rectified pulse signal; a pulse generation unit for generating a signal having a pulse width including a section in which a high frequency signal of the rectified pulse signal is regularly distributed; a latch unit for latching the signal generated in the pulse generation unit; and a detection unit for detecting the section in which the high frequency signal is regularly distributed by using an output signal of the latch unit and an output signal of the pulse generation unit.

The pulse generation unit includes a first signal generator for generating a first pulse signal by evenly dividing the rectified pulse signal, and a second signal generator for generating a second pulse signal having a pulse width extended for an established clock period in synchronization with the divided signal, and the latch unit latches the second pulse signal based on the first pulse signal.

The writable area detection device further comprises a system controller for controlling the first and second signal generators in correspondence to operation states of the optical recording/reproducing apparatus.

In the meantime, a writable area detection method for an optical recording/reproducing apparatus comprises steps of comparing an RF signal read from a user data area of a recording medium with a reference signal, and outputting a rectified pulse signal; generating a signal having a pulse width including a section in which a high frequency signal of the rectified pulse signal is regularly distributed; latching the signal generated in the pulse generation step; and detecting the section in which the high frequency signal is regularly distributed by using an output signal of the latch step and an output signal of the pulse generation step.

The pulse generation step includes a first signal generation step for evenly dividing the rectified pulse signal and generating a first pulse signal, and a second generation step for generating a second pulse signal having a pulse width extended for an established clock period in synchronization with the divided signal, and the latch step latches the second pulse signal based on the first pulse signal.

Accordingly, a system controller controls the first signal generator and the second signal generator in correspondence to the series and speed of an optical recording medium to output a signal having a pulse width including the writable area, so that the writable area detection device can detect the writable area more precisely.

BRIEF DESCRIPTION OF THE DRAWINGS

The illustrative, non-limiting embodiments of the present invention will be described in detail with reference to the following drawings in which like reference numerals refer to like elements, and wherein:

FIGS. 5A-5E are views for showing input and output waveforms for explaining operations of the writable area detection device of FIG. 4.

DETAILED DESCRIPTION OF THE EXEMPLARY EMBODIMENTS

Hereinafter, the present invention will be described in detail with reference to the accompanying drawings.

Figure 1:
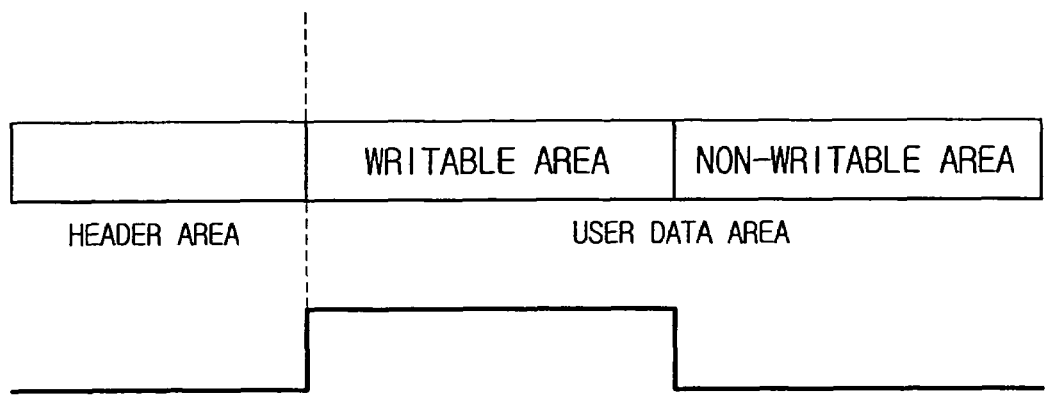
FIG. 1 is a conceptual view for divided areas on a general optical recording medium.
Figure 2:
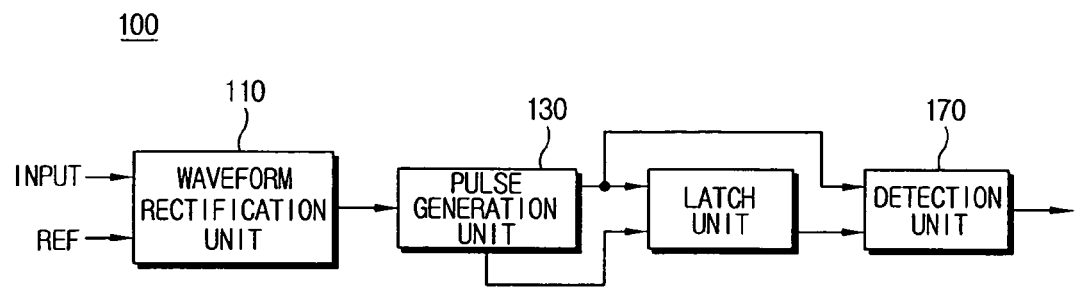
FIG. 2 is a block diagram for showing a writable area detection device for an optical recording/reproducing apparatus according to an illustrative, non-limiting embodiment of the present invention.

In general, an optical recording/reproducing apparatus reproduces data recorded on an optical recording medium in use of a push-pull method. An RF push-pull signal read from an optical recording medium by the push-pull method is inputted to a writable area detection device shown in FIG. 2 according to an illustrative, non-limiting embodiment of the present invention.

The writable area detection device 100 has a waveform rectification unit 110, a pulse generation unit 130, a latch unit 150, a detection unit 170, and so on.

The waveform rectification unit 110 compares an input RF push-pull signal INPUT with a reference signal REF and outputs a predetermined rectified pulse signal.

Figure 3:
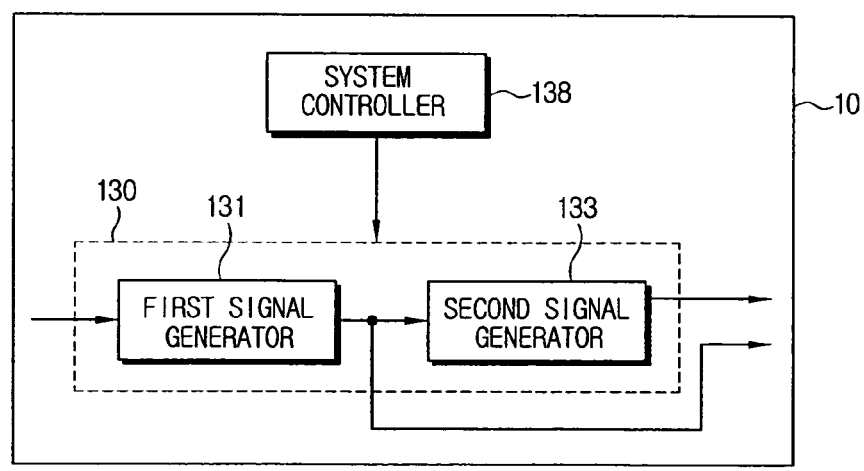
FIG. 3 is a block diagram for showing in detail a pulse generation unit 130 of the writable area detection device of FIG. 2.

Of the rectified pulse signal outputted from the waveform rectification unit 110, the pulse generation unit 130 generates a pulse signal including a signal corresponding to a reproducing signal. The pulse generation unit 130, as shown in FIG. 3, has a first signal generator 131 and a second signal generator 133. The first signal generator 131 outputs a first pulse signal obtained from an even division of a pulse of an input signal, and the second signal generator 133 outputs a second pulse signal having a pulse width extended during a clock period T set in synchronization with edges of the first pulse signal outputted from the first signal generator 131. The first and second signal generators 131 and 133 are controlled by a system controller 138 in correspondence to the kind and an operation speed of an optical recording/reproducing apparatus 10.

The latch unit 150 latches and outputs a second pulse signal generated from the second signal generator 133 based on the first pulse signal generated from the first signal generator 131.

The detection unit 170 outputs a detection signal corresponding to a writable area in use based on an output signal of the latch unit 150 and an output signal of the pulse generation unit 130.

Figure 4:
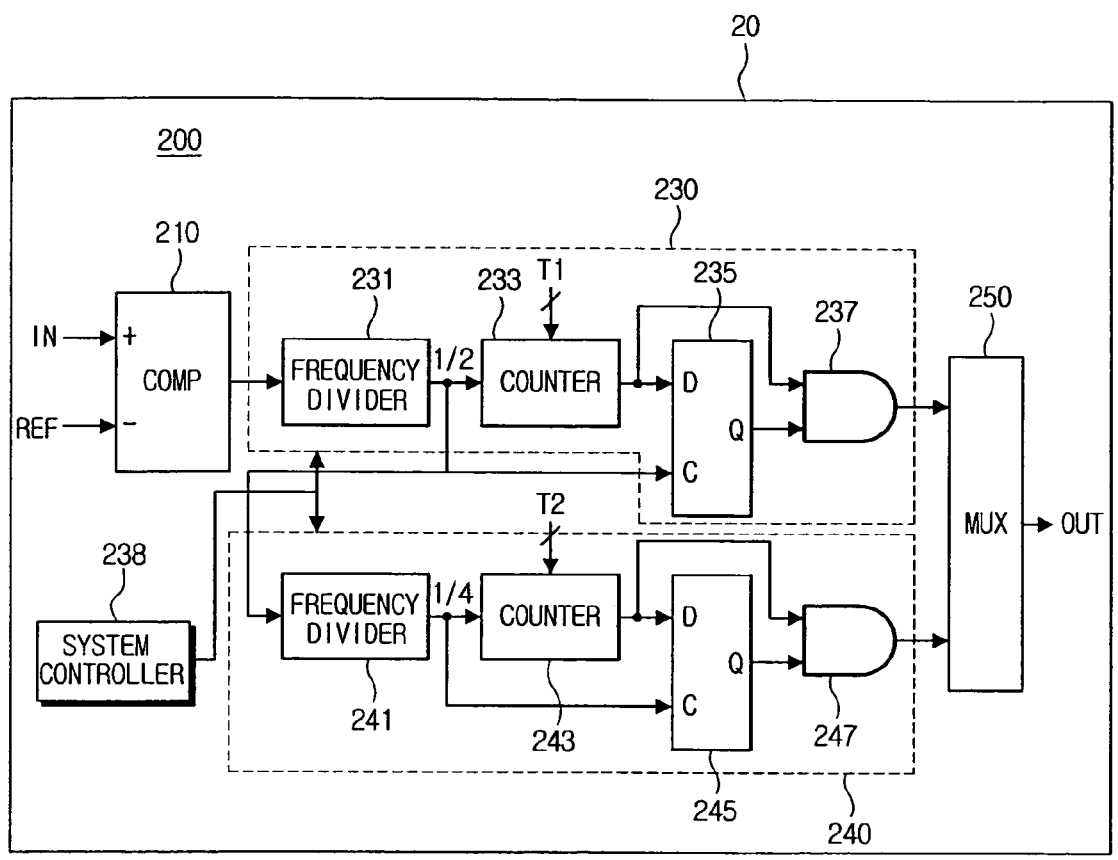
FIG. 4 is a block diagram for showing the writable area detection device of FIG. 2 according to an illustrative, non-limiting embodiment of the present invention.

FIG. 4 is a circuit diagram for showing components of a writable area detection device for an optical recording/reproducing apparatus according to an illustrative, non-limiting embodiment of the present invention.

Figure 6:
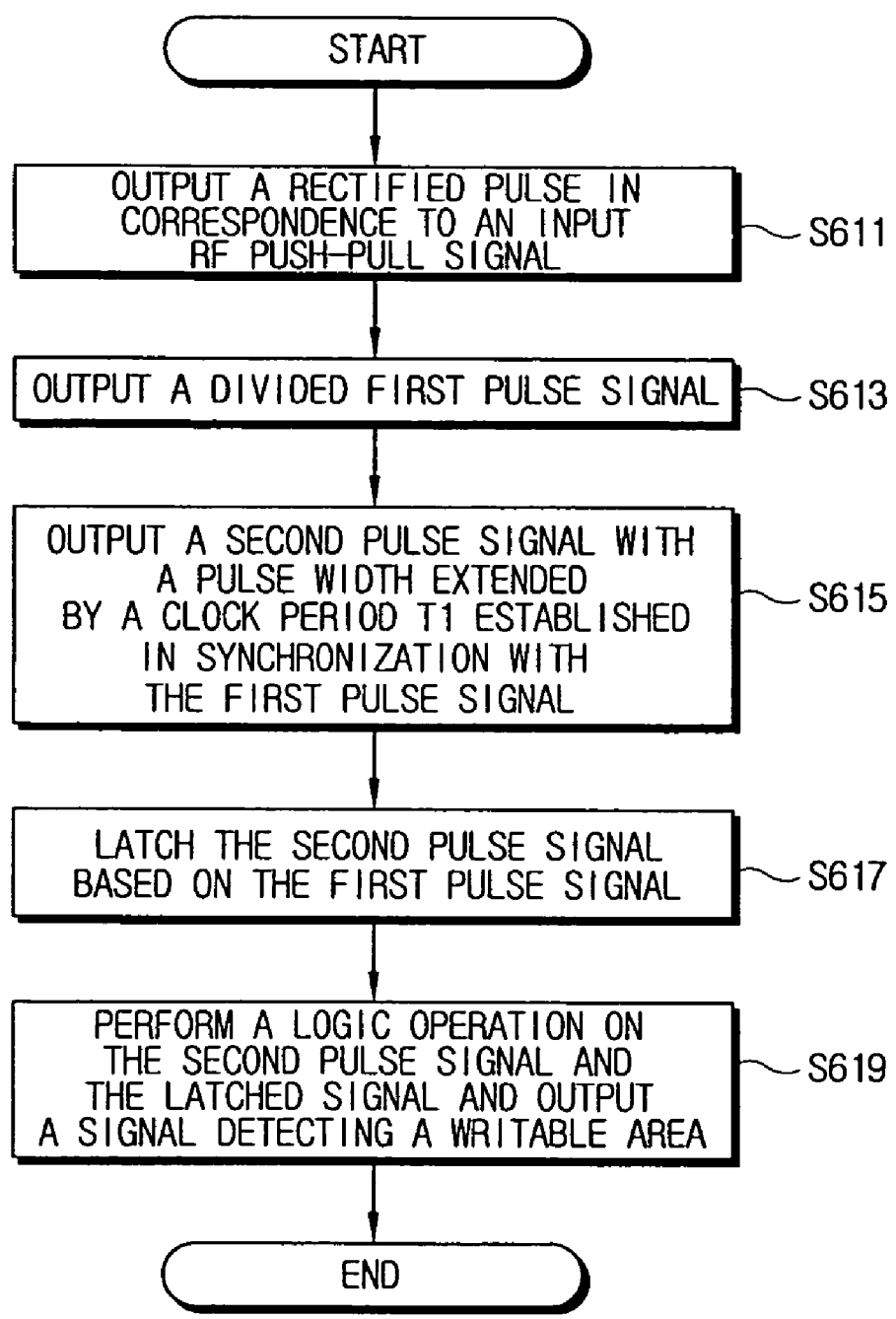
FIG. 6 is a flow chart for explaining a writable area detection method for the writable area detection device of FIG. 3.

A writable area detection device 200 includes a first path 230 having a comparator 210, a first frequency divider 231, a first counter 233, a first D flip-flop 235, and a first AND gate 237, a second path 240 having a second frequency divider 241, a second counter 243, a second D flip-flop 245, and a second AND gate 247, and a multiplexer 250. FIG. 4 is an exemplary view for a writable area detection device having multiple paths depending upon the series, speed, and so on, of an optical recording/reproducing apparatus 20. As shown in FIG. 4, the first path 230 and the second path 240 are the same, so a process for detecting a writable area through the first path 230 is described, and, in addition, the process will be described in more detail with reference to waveforms shown in FIGS. 5A-5E and a flow chart shown in FIG. 6.

The comparator 210 compares an input RF push-pull signal with the reference signal REF, and outputs a "high" signal if the RF push-pull signal is larger than the reference signal REF and outputs a "low" signal if the RF push-pull signal is smaller than the reference signal REF, and generates a rectified pulse signal as shown in FIG. 5A (S611). Referring to a waveform shown in FIG. 5A, a regular high frequency signal is a signal read according to recorded data on the writable area A of the user data area. On the other hand, irregular low frequency signal and high frequency signal are signals read according to noise of the non-writable area B. Accordingly, a signal finally outputted from the writable area detection device 200 is detected as a signal corresponding to the writable area A, and a detection process is described later in detail.

The first frequency divider 231 divides by 2 the rectified pulse signal outputted from the comparator 210 and outputs a first pulse signal as shown in FIG. 5B. That is, the output signal of FIG. 5B of the first frequency divider 231 is outputted as a signal of one period every two periods of the output signal of FIG. 5A of the comparator 230 (S613).

The first counter 233 is synchronized with the signal divided by 2 as shown in FIG. 5B, and counts the divided-by-2 signal at its rising edge by a predetermined value in correspondence to a main clock. That is, upon the rising edge of the divided-by-2 signal, the first counter 233 outputs the second pulse signal having a pulse width extended for as long a clock period T1 as the predetermined value. At this time, the value provided to the first counter 233 is a value that is combined with a value of the first frequency divider and established by the system controller 238 in correspondence to the series and speed of the optical recording/reproducing device 20. For example, in case that an optical recording medium is a CD and an operation speed is 2×, the system controller 238 combines the first frequency divider and the first counter and controls the first frequency divider 231 and the first counter 233 to be in the optimum conditions. That is, the first frequency divider 231 is a ½ frequency divider, and the value of the first counter 233 is set in correspondence to the clock period T1=1/(MCLK/256/16) wherein the MCLK denotes a main clock.

Accordingly, the output signal of the first counter 233 becomes the second pulse signal having a pulse width including the writable area A as shown in FIG. 5C (S615). The first pulse signal of FIG. 5B and the second pulse signal of FIG. 5C outputted as above are inputted to a clock terminal CK and an input terminal D of the first D flip-flop 235, respectively.

According to operation characteristics of the general D flip-flop, if a "high" signal is inputted to the clock terminal CK, the D flip-flop outputs to an output terminal Q a signal inputted to the input terminal D, and, if a "low" signal is inputted to the clock terminal CK, the D flip-flop outputs to the output terminal Q the signal previously inputted to the input terminal D. That is, the D flip-flop latches the signal inputted to the input terminal D based on a signal inputted to the clock terminal CK.

Accordingly, the first D flip-flop 235 latches and outputs the second pulse signal of FIG. 5C inputted to the input terminal D based on the first pulse signal of FIG. 5B inputted to the clock terminal CK as shown in FIG. 5D (S617).

Thereafter, the first AND gate 237 logic-ANDs the second pulse signal of FIG. 5C and the latched signal of FIG. 5D, and outputs a "high" signal only when both signals are in the "high" state as shown in FIG. 5E. Therefore, as shown in the waveforms of FIGS. 5A-5E, the first AND gate 237 outputs a signal generating a pulse in correspondence to the writable area A (S619).

In the meantime, if a recording medium is a DVD and an operation speed is 4×, for example, the system controller 238 decides the optimum conditions of the first signal generator and the second signal generator, and sets a ¼ frequency division and T2=1/(MCLK/4096/16). Accordingly, the writable area is detected through the second path 240.

That is, the first pulse signal is divided by 4 through the second frequency divider 241 of the second path 240 and is outputted as a second pulse signal having a pulse width extended for a clock period T2 set by the second counter 243 with a value established in correspondence to the T2=1/(MCLK/4096/16). Thereafter, a process for detecting a writable area through the second D flip-flop 245 and the second AND gate 247 is performed in the same manner as described above.

As aforementioned, a signal detecting the writable area through the second path 240 is selected by and outputted from the multiplexer 250. Accordingly, the system controller 238 of the optical recording/reproducing device 20 selects the optimum path and establishes the counter values in correspondence to the series and speed.

Accordingly, the writable area detection device can precisely detect the writable area of the user data area on which data is recorded.

The writable area detection device according to the present invention controls the pulse generation unit to produce a signal having a predetermined pulse including the writable area, and uses the operation characteristics of the D flip-flops so as to enable the writable area to be precisely detected.

Further, the writable area detection device outputs a signal having a predetermined pulse including the writable area through frequency dividers and counters combined in correspondence to the series and speed of an optical recording medium according to the control of the system controller, and uses the operation characteristics of the D flip-flops, to thereby enable the writable area to be precisely detected.

While the invention has been shown and described with reference to certain illustrative, non-limiting embodiments thereof, it will be understood by those skilled in the art that various changes in form and details may be made therein without departing from the spirit and scope of the invention as defined by the appended claims.

What is claimed is:

1. A writable area detection device for an optical recording/reproducing apparatus, comprising:
   a waveform rectification unit for comparing an RF signal read from a user data area of a recording medium with a reference signal, and outputting a rectified pulse signal, said user data area comprising a writable area and a non-writable area;
   a pulse generation unit for generating a pulse signal based on the rectified pulse signal,
   a latch unit for latching the pulse signal; and
   a detection unit for detecting only said writable area of the user data area of the recording medium by using an output signal of the latch unit and the pulse signal.

2. A writable area detection device for an optical recording/reproducing apparatus, comprising:
   a waveform rectification unit for comparing an RF signal read from a user data area of a recording medium with a reference signal, and outputting a rectified pulse signal, said user data area comprising a writable area and a non-writable area;
   a pulse generation unit for generating a first pulse signal and a second pulse signal based on the rectified pulse signal,
   a latch unit for latching the second pulse signal based on the first pulse signal; and
   a detection unit for detecting only said writable area of the user data area of the recording medium by using an output signal of the latch unit and the second pulse signal.

3. A writable area detection device for an optical recording/reproducing apparatus, comprising:
   a waveform rectification unit for comparing an RF signal read from a user data area of a recording medium with a reference signal, and outputting a rectified pulse signal;
   a pulse generation unit for generating a first pulse signal and a second pulse signal based on the rectified pulse signal,
   a latch unit for latching the second pulse signal based on the first pulse signal; and
   a detection unit for detecting a writable area of the recording medium by using an output signal of the latch unit and the second pulse signal, wherein the pulse generation unit further comprises:
   a first signal generator for generating the first pulse signal by evenly dividing the rectified pulse signal; and
   a second signal generator for generating the second pulse signal having its pulse width extended for an established clock period in synchronization with the first pulse signal.

4. The writable area detection device as claimed in claim 3, further comprising a system controller for controlling the first signal generator and the second signal generator in correspondence to operation states of the optical recording/reproducing apparatus.

5. The writable area detection device as claimed in claim 2, wherein the latch unit includes D flip-flops.

6. The writable area detection device as claimed in claim 2, wherein the detection unit includes AND gates.

7. The writable area detection device as claimed in claim 3, wherein the first signal generator is a frequency divider, and the second signal generator is a counter.

8. A writable area detection method for an optical recording/reproducing apparatus, comprising:
   comparing an RF signal read from a user data area of a recording medium with a reference signal, and outputting a rectified pulse signal, said user data area comprising a writable area and a non-writable area;
   generating a pulse signal based on the rectified pulse signal;
   latching the pulse signal; and
   detecting only said writable area of the user data area of the recording medium by using an output signal of the latching and the pulse signal.

9. A writable area detection method for an optical recording/reproducing apparatus, comprising:
   comparing an RF signal read from a user data area of a recording medium with a reference signal, and outputting a rectified pulse signal, said user data area comprising a writable area and a non-writable area;
   generating a first pulse signal and a second pulse signal based on the rectified pulse signal;
   latching the second pulse signal based on the first pulse signal; and
   detecting only said writable area of the user data area of the recording medium by using an output signal of the latching and the second pulse signal.

10. A writable area detection method for an optical recording/reproducing apparatus, comprising:
    comparing an RF signal read from a user data area of a recording medium with a reference signal, and outputting a rectified pulse signal;
    generating a first pulse signal and a second pulse signal based on the rectified pulse signal;
    latching the second pulse signal based on the first pulse signal; and
    detecting a writable area of the user data of the recording medium by using an output signal of the latching and the second pulse signal, wherein the generating comprises:
    generating the first pulse signal by evenly dividing the rectified pulse signal; and generating the second pulse signal having the pulse width extended for an established clock period in synchronization with the first pulse signal.

11. The writable area detection method as claimed in claim 10, further comprising controlling the generating of the first pulse signal and the generating of the second pulse signal in correspondence to operation states of the optical recording/reproducing apparatus.

12. The writable area detection method as claimed in claim 9, wherein the latching is performed by D flip-flops.

13. The writable area detection method as claimed in claim 9, wherein the detecting logic-ANDs by an AND gate the output signal of the latching and the second pulse signal.

14. The writable area detection method as claimed in claim 10, wherein the generating of the first pulse signal is performed by a frequency divider, and the generating of the second pulse signal is performed by a counter.

* * * * *